US009830634B2

(12) United States Patent
Garbow et al.

(10) Patent No.: US 9,830,634 B2
(45) Date of Patent: Nov. 28, 2017

(54) PERFORMING SECURE FINANCIAL TRANSACTIONS IN AN INSTANT MESSAGING ENVIRONMENT

(75) Inventors: Zachary Adam Garbow, Rochester, MN (US); Frederick Allyn Kulack, Rochester, MN (US); Kevin Glynn Paterson, San Antonio, TX (US)

(73) Assignee: International Business Machines Corporation, Armonk, NY (US)

( * ) Notice: Subject to any disclaimer, the term of this patent is extended or adjusted under 35 U.S.C. 154(b) by 2720 days.

(21) Appl. No.: 11/360,344

(22) Filed: Feb. 23, 2006

(65) Prior Publication Data

US 2007/0219901 A1    Sep. 20, 2007

(51) Int. Cl.
*G06Q 30/06* (2012.01)
*G06Q 20/10* (2012.01)

(52) U.S. Cl.
CPC ......... *G06Q 30/0629* (2013.01); *G06Q 20/10* (2013.01); *G06Q 30/06* (2013.01); *G06Q 30/0623* (2013.01); *G06Q 30/0641* (2013.01); *G06Q 30/0601* (2013.01)

(58) Field of Classification Search
USPC ........................................ 705/30–45, 50–79
See application file for complete search history.

(56) References Cited

U.S. PATENT DOCUMENTS

| | | | |
|---|---|---|---|
| 5,708,422 A * | 1/1998 | Blonder et al. ............. 340/5.41 |
| 6,070,149 A * | 5/2000 | Tavor et al. ................... 705/26 |
| 6,272,472 B1 * | 8/2001 | Danneels ........... G06Q 30/0253 | 705/14.51 |
| 6,484,182 B1 * | 11/2002 | Dunphy ............ G06F 17/30958 | 700/231 |
| 6,961,858 B2 * | 11/2005 | Fransdonk .............. G06F 21/10 | 380/281 |
| 7,020,635 B2 * | 3/2006 | Hamilton ............... G06Q 20/00 | 705/51 |
| 7,080,049 B2 * | 7/2006 | Truitt .................... G06Q 20/16 | 380/30 |

(Continued)

FOREIGN PATENT DOCUMENTS

| | | |
|---|---|---|
| JP | 10312431 A | 11/1998 |
| JP | 2000276547 A | 10/2000 |

(Continued)

*Primary Examiner* — Mamon Obeid
(74) *Attorney, Agent, or Firm* — Martin & Associates, LLC; Derek P. Martin

(57) ABSTRACT

An apparatus and method provide simple and secure financial transactions in an instant messaging (IM) environment. Two users may engage in an IM session (chat session), with negotiations for a product or service taking place during the chat session. One or both of the users may activate an IM financial transaction mechanism during the chat session. The IM financial transaction mechanism analyzes the chat text, and presents a draft transaction to both buyer and seller, with options based on the analyzed chat text. The draft transaction may be modified by both buyer and seller, who both confirm the draft transaction when all of the details are correct. The confirmed transaction is then sent to a web server that includes an interface to the buyer's online account, and payment is made by transferring the funds for the confirmed transaction from the buyer's online account to an account for the seller.

2 Claims, 6 Drawing Sheets

(56) References Cited

U.S. PATENT DOCUMENTS

| | | | |
|---|---|---|---|
| 7,090,128 B2* | 8/2006 | Farley | H04L 67/2823 235/384 |
| 7,092,370 B2* | 8/2006 | Jiang et al. | 370/329 |
| 7,107,462 B2* | 9/2006 | Fransdonk | G06Q 20/12 380/282 |
| 7,150,045 B2* | 12/2006 | Koelle | G06F 21/552 380/201 |
| 7,337,324 B2* | 2/2008 | Benaloh | G06F 21/31 713/168 |
| 7,363,269 B2* | 4/2008 | Horsfall et al. | 705/37 |
| 7,587,502 B2* | 9/2009 | Crawford | A63F 13/12 463/42 |
| 7,711,586 B2* | 5/2010 | Aggarwal | G06Q 10/02 700/14 |
| 2002/0184102 A1* | 12/2002 | Markopoulos | G06Q 30/0601 705/26.1 |
| 2003/0171995 A1* | 9/2003 | Dezonno | G06Q 30/0611 705/26.4 |
| 2004/0059644 A1* | 3/2004 | Blau | G06Q 20/10 705/26.3 |
| 2005/0027635 A1* | 2/2005 | Monroe | G06Q 40/04 705/37 |
| 2005/0065802 A1* | 3/2005 | Rui | G06Q 30/02 715/764 |
| 2005/0120201 A1* | 6/2005 | Benaloh | G06F 21/31 713/155 |
| 2005/0131770 A1* | 6/2005 | Agrawal | G06Q 30/0201 705/7.29 |
| 2006/0241860 A1* | 10/2006 | Kimchi | G01C 21/26 701/532 |
| 2007/0219901 A1* | 9/2007 | Garbow | G06Q 30/06 705/39 |
| 2013/0246392 A1* | 9/2013 | Farmaner | G06F 17/30976 707/713 |

FOREIGN PATENT DOCUMENTS

| | | |
|---|---|---|
| JP | 2001092899 A | 4/2001 |
| JP | 2001125909 A | 5/2001 |
| JP | 2002049805 A | 2/2002 |
| JP | 2004239950 A | 8/2004 |
| JP | 2004537797 A | 12/2004 |
| JP | 2005276007 A | 10/2005 |

* cited by examiner

Transaction Draft — 210, 610

Item to be Purchased: [                    ]
Revenge of the Sith DVD

Price: [   620   ]  $3  $5  $7  $15  $20

Other Charges: [   630   ]  $3  $5  $7  $15  $20

Description of Other Charges: [  640  ]  Shipping

Total: [  650  ]  660  670  680

( Confirm Transaction )  ( Cancel )  ( Show Chat Window )

FIG. 6

Transaction Draft — 210, 610

Item to be Purchased: [ Revenge of the Sith DVD ]
Revenge of the Sith

Price: [ $7.00 ] 620  $3  $5  $7  $15  $20

Other Charges: [ $3.00 ] 630  $3  $5  $7  $15  $20

Description of Other Charges: [ Shipping ] 640  Shipping

Total: [ $10.00 ] 650  660  670  680

( Confirm Transaction )  ( Cancel )  ( Show Chat Window )

FIG. 7

PERFORMING SECURE FINANCIAL TRANSACTIONS IN AN INSTANT MESSAGING ENVIRONMENT

BACKGROUND OF THE INVENTION

1. Field of the Invention

This invention generally relates to electronic commerce, and more specifically relates to an apparatus and method for performing secure financial transactions in an instant messaging environment.

2. Background Art

Consumers continue to gain trust in the internet as a platform for purchasing goods and services. Due to this widespread adoption of e-commerce, users are beginning to purchase a wider variety of goods, within all price ranges at an increasing rate. While previous distrust of internet security prevented many people from risking information theft during low-cost or spontaneous potential purchases, spending on inexpensive items is now becoming big business too. As such, overall e-commerce spending continues to rapidly increase in pace.

Known methods of conducting e-commerce allow a user who wishes to purchase a product or service to invoke a web page of the vendor, fill in appropriate purchase and payment information into a form, and then submit the form. The vendor's e-commerce site then verifies the order information, verifies payment, and authorizes the delivery of the purchased goods or services.

This typical model of e-commerce described above does not work well in a real-time collaborative environment, such as an Instant Messaging (IM) environment. Let's assume that two users are chatting during an IM session. Let's also assume that one of the users agrees to sell an item to the other user. One way to complete the transaction is to have the seller list the item for sale on the seller's e-commerce site, where the buyer can then purchase the item by navigating to the web site and filling out a form with the purchase and payment information. This is a large amount of effort for both buyer and seller, and for items that are less than a dollar or two, the hassle is often not worth the time and effort. Without a way to provide simple, secure financial transactions in an IM environment, consumers will not be able to easily purchase goods and services during a chat session, causing an impediment to the spread of e-commerce, especially for inexpensive goods and services.

BRIEF SUMMARY OF THE INVENTION

According to the preferred embodiments, an apparatus and method provide simple and secure financial transactions in an instant messaging (IM) environment. Two users may engage in an IM session (chat session), with negotiations for a product or service taking place during the chat session. One or both of the users may activate an IM financial transaction mechanism during the chat session. The IM financial transaction mechanism analyzes the chat text, and presents a draft transaction to both buyer and seller, with options based on the analyzed chat text. The draft transaction may be modified by both buyer and seller, who confirm the draft transaction when all of the details are correct. The confirmed transaction is then sent to a web server that includes an interface to the buyer's online account, and payment is made by transferring the funds for the confirmed transaction from the buyer's online account to an account for the seller. In this manner, financial transactions based on a chat session are very simple and easy to perform.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

FIG. 6 is a sample transaction draft with options based on analyzing the text of the chat session shown in FIG. 5;

FIG. 7 is the sample transaction draft in FIG. 6 after the buyer and seller select or fill in values for the required fields;

DETAILED DESCRIPTION OF THE INVENTION

The preferred embodiments provide a simple and efficient way to perform financial transactions in an instant messaging (IM) environment. An IM financial transaction mechanism may be activated by one or both participants of a chat session. The chat text is analyzed, and a draft transaction is presented to both buyer and seller, allowing both buyer and seller to modify the draft transaction. Once the buyer and seller agree that the draft transaction represents their agreement, both buyer and seller must confirm the draft transaction. Once confirmed, the confirmed transaction is sent to a server that includes an interface to the buyer's online account, and funds are transferred from the buyer's account to an account for the seller. The preferred embodiments also support real-time web searches based on chat text so the buyer and seller automatically have access to additional information to support the sale.

Figure 1:
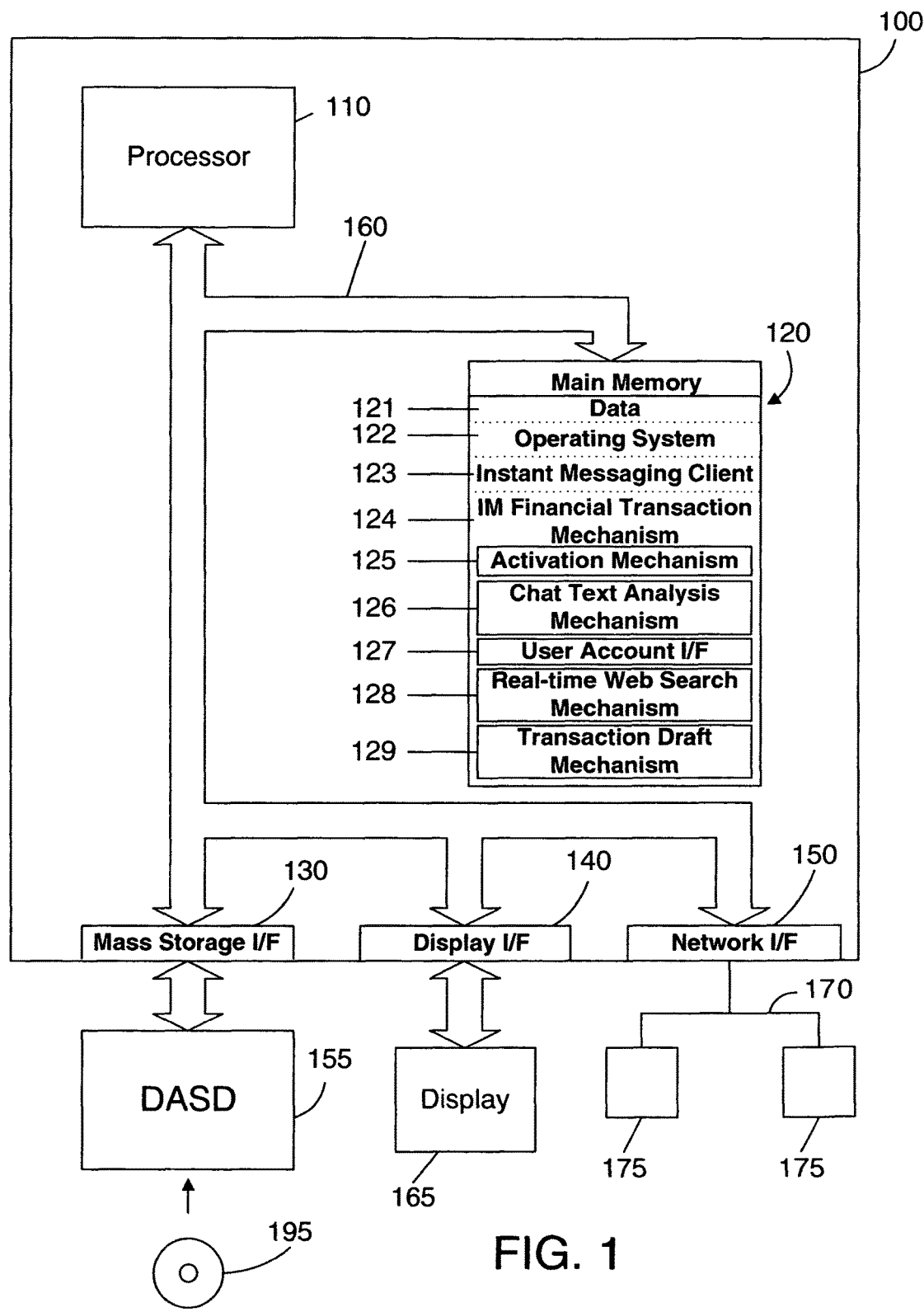
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system that is capable of being logically partitioned, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, an instant messaging client 123, and an instant messaging (IM) financial transaction mechanism 124. Data 121 represents any data that serves as input to or output from any program in computer system 100. Operating system 122 is a multi-tasking operating system known in the industry as i5/OS; however, those skilled in the art will appreciate that the spirit and scope of the present invention is not limited to any one operating system. Instant messaging client 123 is preferably software that supports peer-to-peer instant messaging, or chat sessions, as is commonly known in the art.

The IM financial transaction mechanism 124 preferably includes an activation mechanism 125, a chat text analysis mechanism 126, a user account interface 127, a real-time web search mechanism 128, and a transaction draft mechanism 129. The activation mechanism 125 is any suitable way for a user to invoke the IM financial transaction mechanism 124, and may include a button or menu selection in a chat window, one or more keystrokes on a keyboard, etc. The chat text analysis mechanism 126 is used to analyze the chat text and to make best guesses regarding the product being purchased, the price, etc. The user account interface 127 allows for direct accessing of a user's online account. The real-time web search mechanism 128 can automatically perform web searches based on analyzed chat text. For example, if a person is chatting with a Sears representative about the features of a cordless drill, the real-time web search mechanism 128 could automatically perform a web search on the sears.com web site (based, for example, on the sears.com suffix of the Sears representative's e-mail address). The user could then reference a particular page, or cut-and-paste the link, page, picture, etc. into the chat session. The real-time web search mechanism 128 could also perform one or more searches to find out how much the cordless drill is selling for by different online vendors. For example, the real-time web search mechanism could present to the potential buyer a high price, low price, and average price of the cordless drill by the online vendors it was able to access. The potential buyer can then compare the price provided by the Sears representative with the prices available at other online vendors to know whether the price is a good one or not. The potential seller can also benefit from performing automatic real-time web searches based on the chat text. The real-time web search mechanism 128 expressly extends to any and all mechanisms for performing a web search based on chat text.

Figure 2:
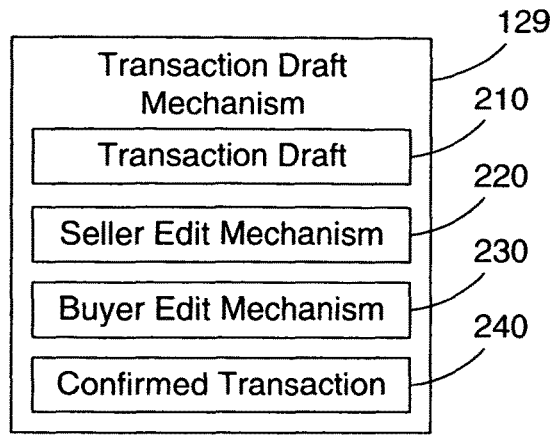
FIG. 2 is a block diagram of the transaction draft mechanism shown in FIG. 1.

The transaction draft mechanism 129 receives information from the chat text analysis mechanism 126 regarding the best guesses for the product or service being sold, price, terms, etc. Details of the transaction draft mechanism 129 are shown in FIG. 2 and discussed in more detail below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, IM client 123, and IM financial transaction mechanism 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD-RW (e.g., 195 of FIG. 1), and transmission type media such as digital and analog communications links. Note that the preferred signal bearing media is tangible.

Referring to FIG. 2, the transaction draft mechanism 129 shown in FIG. 1 preferably includes a transaction draft 210, a seller edit mechanism 220, a buyer edit mechanism 230, and a confirmed transaction 240. The transaction draft 210 is preferably generated using the chat text that was analyzed by the chat text analysis mechanism 126 in FIG. 1. The transaction draft 210 includes "best guess" estimates of the product or service being purchased, the price, and other possible aspects of the purchase. The seller edit mechanism 220 allows the seller to select one of the best guess estimates or to manually enter needed information. Similarly, the buyer edit mechanism 230 allows the buyer to select one of the best guess estimates or to manually enter needed information. Note that the seller edit mechanism 220 and buyer edit mechanism 230 preferably operate on the same transaction draft 210 so that changes made by one party may be seen by the other party. Of course, the edit mechanisms 220 and 230 could also operate on different copies of the transaction draft 210, which would require that the two copies be compared and reconciled. Once the seller and buyer are happy with the transaction draft 210, the seller and buyer confirm the transaction draft. A transaction draft, once confirmed by both seller and buyer, becomes a confirmed transaction 240. This confirmed transaction 240 can then be used to initiate a transfer of funds to complete the confirmed transaction 240.

Figure 3:
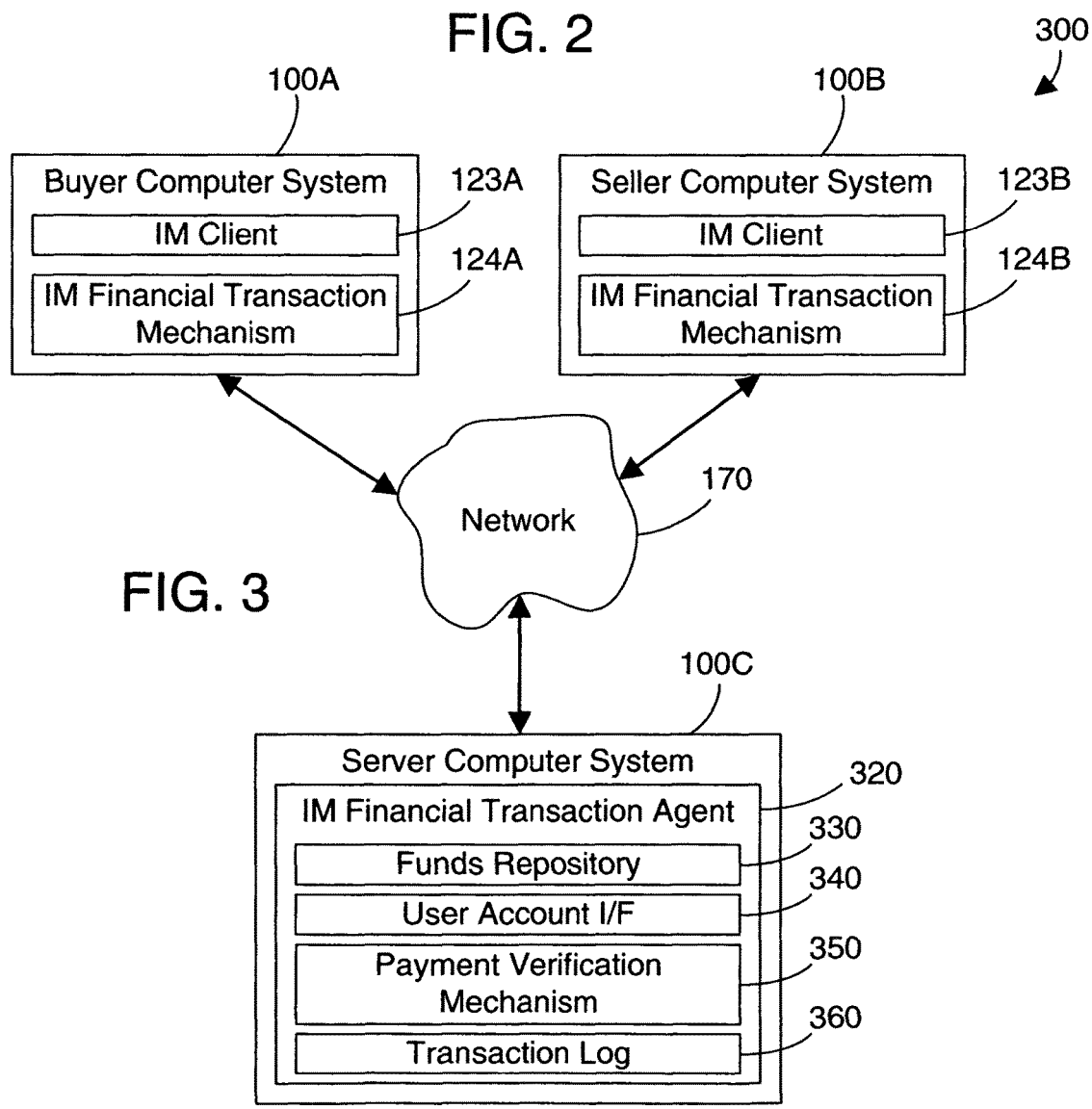
FIG. 3 is a block diagram of a networked computer system in accordance with the preferred embodiments.

Referring to FIG. 3, a networked computer system 300 shows a sample configuration within the scope of the preferred embodiments. A buyer computer system 100A includes an IM client 123A and a corresponding IM financial transaction mechanism 124A, which are specific instances of the IM client 123 and IM financial transaction mechanism 124 shown in FIG. 3. A seller computer system 100B includes an IM client 123B and a corresponding IM financial transaction mechanism 124B, which are also specific instances of the IM client 123 and IM financial transaction mechanism 124 shown in FIG. 3. A server computer system 100C preferably includes an IM financial transaction agent 320 that includes a funds repository 330, a user account interface 340, a payment verification mechanism 350, and a transaction log 360. The funds repository 330 preferably includes an account for the buyer, and may optionally include an account for the seller. Optionally, the funds repository 220 could exist at an external location, with the login information being stored in the IM account. Thus, a buyer could enter information regarding his or her bank account into an IM screen, which would then allow the IM financial transaction mechanism to directly access the user's account. The user account interface 340 is an interface that provides authenticated access to the buyer's account, and may optionally provide authenticated access to the seller's account. The payment verification mechanism 350 verifies that the funds in the confirmed transaction are transferred from the buyer's account. Note that the buyer's funds may be transferred to the seller's account if the IM financial transaction agent 320 includes a user account interface for the seller's account or may be held in an escrow or holding account for later delivery to the seller. The transaction log 360 is an electronic record of the transaction, and preferably includes the confirmed transaction (240 in FIG. 2) along with the chat text from the chat session upon which the transaction was based. In this manner, any potential disputes about a completed transaction may be addressed by looking at the chat text in the transaction log 360.

Figure 4:
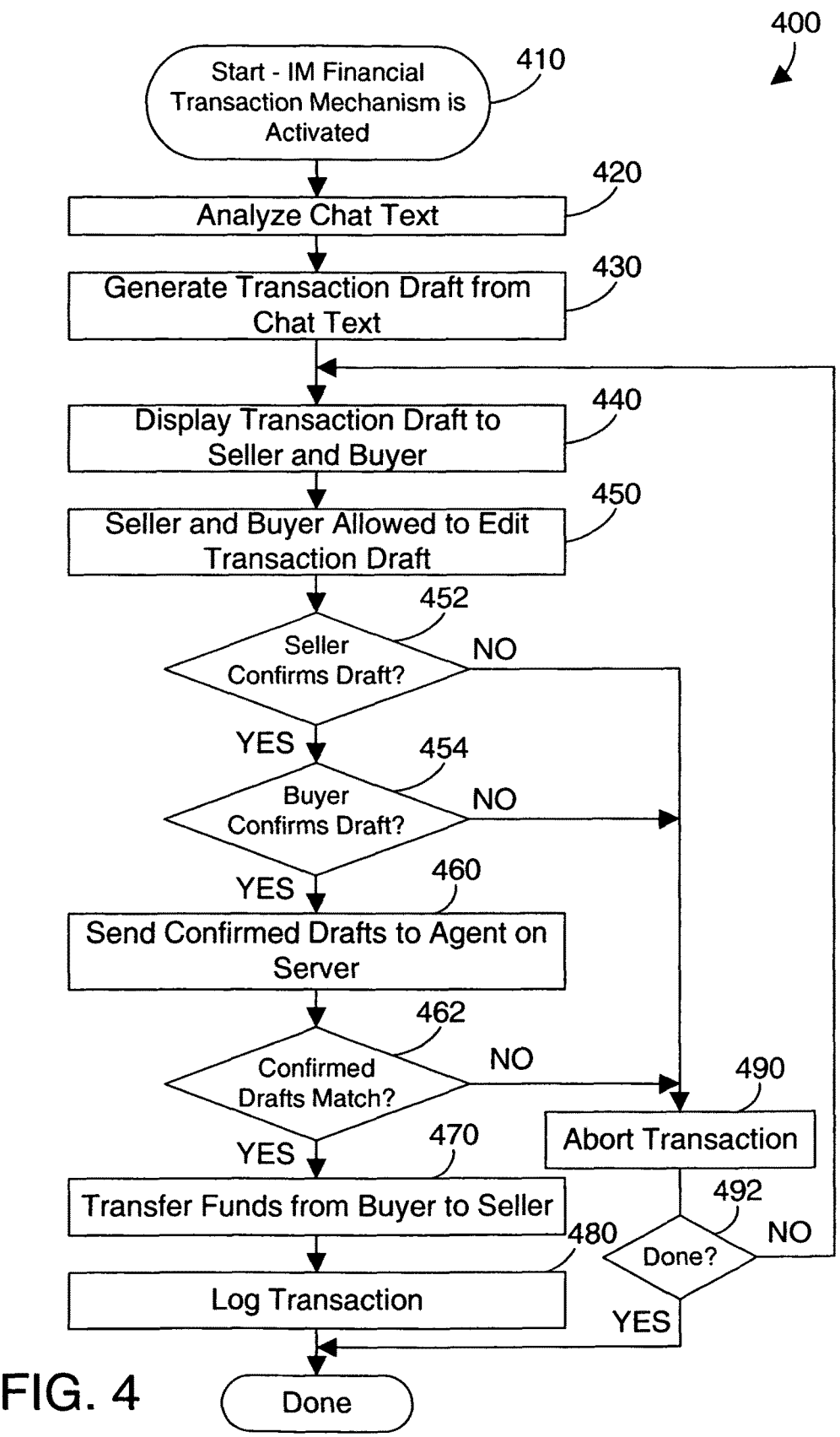
FIG. 4 is a flow diagram of a method for performing a financial transaction in an instant messaging environment within the scope of the preferred embodiments.

Referring to FIG. 4, a method 400 in accordance with the preferred embodiments begins when the IM financial transaction mechanism is activated (step 410). As explained above, the user may activate the IM financial transaction mechanism in any suitable way. In the alternative, the IM financial transaction mechanism could be activated periodically during a chat session by the IM client. This would allow the chat text to be processed in the background real-time at periodic time intervals, say 10 seconds. Once activated, the IM financial transaction mechanism analyzes the chat text (step 420), and generates a transaction draft from the chat text (step 430). The transaction draft is then displayed to the seller and the buyer (step 440). The seller and buyer are allowed to edit the transaction draft (step 450). If the seller confirms the transaction draft (step 452=YES) and the buyer confirms the transaction draft (step 454=YES), the confirmed drafts are sent by the buyer and seller to the IM financial transaction agent on a server (step 460), such as agent 320 on server 100C shown in FIG. 3. The agent compares the confirmed draft sent by the seller to the confirmed draft sent by the buyer. If the confirmed drafts match (step 462=YES), the funds are transferred from the buyer to the seller (step 470), and the transaction is logged (step 480). As explained above, transferring funds from the buyer to the seller may include the intermediate step of transferring the buyer's funds to a holding or escrow account, then delivering the funds from the holding or escrow account to the seller. If the seller does not confirm the transaction draft (step 452=NO), if the buyer does not confirm the transaction draft (step 454=NO), or if the confirmed draft sent by the buyer does not match the confirmed draft sent by the seller (step 462=NO), the transaction is aborted (step 490). If the transaction was aborted due to either the buyer or seller confirming the transaction before the terms were agreed-upon (step 490=NO), method 400 loops back to step 440 and continues. Otherwise (step 492=YES), method 400 is done. Note that the agent compares the confirmed transaction draft from the seller with the confirmed transaction draft from the buyer to prevent any attempt to hack the transaction by either side.

Figure 5:
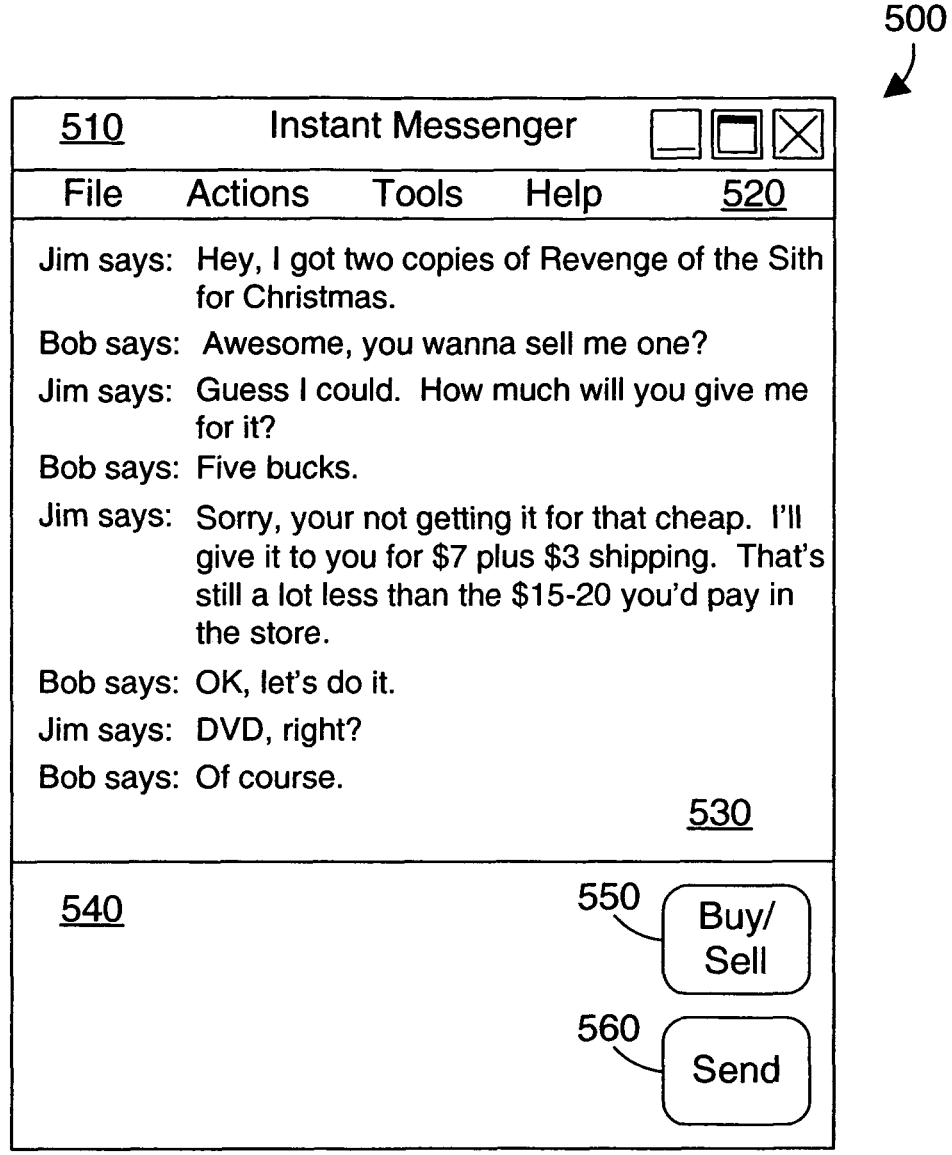
FIG. 5 is a block diagram of a sample instant messenger window showing a sample chat session between two users.

An example is now presented to illustrate some of the concepts of the preferred embodiments. Referring to FIG. 5, an instant messenger window 500 is shown to include a title bar 510, a menu bar 520, a chat window 530, and a typing window 540. The title window 510 shows the name of the program being used, as is commonly known in the art. The menu bar 520 includes multiple drop-down menus. For example, if the user clicks a mouse pointer on the File text in the menu bar, a drop-down menu with file operations is presented to the user. Similarly, if the user clicks a mouse pointer on the Actions text in the menu bar, a drop-down menu with various actions is presented to the user. The general concepts of menu bars and drop-down menus are well-known in the art, and are therefore not discussed further herein.

The chat window 530 shows the text of the parties to a chat session. When a party has something to say during the chat session, he or she types, and the text appears in the typing window 540. When the user hits the "Enter" key on the keyboard or clicks on the send button 560 with a mouse pointer, the text in the typing window 540 is sent to the other party, and is reflected in the chat window 530. General concepts of instant messaging are well-known in the art, and are therefore not discussed further herein.

In this particular example, we assume a user with a chat handle of Jim is chatting with a user with a chat handle of Bob. As shown by the chat text, Jim says he received two copies of a movie Revenge of the Sith for Christmas. Bob responds by asking Jim if he wants to sell one. Jim then asks how much Bob is willing to pay. Bob says five bucks (dollars). Jim says that isn't enough, and proposes $7 plus $3 shipping. Bob agrees. Jim then asks if the correct format is DVD, which Bob says is correct. At this point either Jim or Bob (or both) could click on the Buy/Sell button 550. Note that the Buy/Sell button 550 could remain hidden or grayed out (i.e., disabled) until the chat text indicates a transaction is taking place. The Buy/Sell button 550 is one particular example for activation mechanism 125 shown in FIG. 1. Clicking on the Buy/Sell button 550 activates the IM financial transaction mechanism 124 shown in FIG. 1. In response, the chat text analysis mechanism 126 in FIG. 1 analyzes the chat text. The transaction draft mechanism 129 then generates a transaction draft 210 based on the analyzed chat text. One example of a transaction draft 210 for the chat session shown in FIG. 5 is shown in FIG. 6. The transaction draft 210 for this specific example includes a field 610 that specifies the item to be purchased, a field 620 that specifies the price for the item, a field 630 for other charges, a field 640 for a description of the other charges, and a field 650 for the total amount of the transaction. The transaction draft 210 also includes a button 660 to confirm the transaction, a button 670 to cancel the transaction, and a button 680 to show the chat window.

One of the significant features of the transaction draft 210 is the display of analyzed chat text. In analyzing the chat text, there is only one thing present that corresponds to a commercial product, namely Revenge of the Sith. This can be confirmed by performing a real-time web search, as discussed in detail herein. This text is shown below the field 610, and the user may select this analyzed chat text by simply clicking on it, which will transfer the text to the field 610. In the alternative, the buyer or the seller may manually enter a description of the item to be purchased into field 610.

Figure 8:
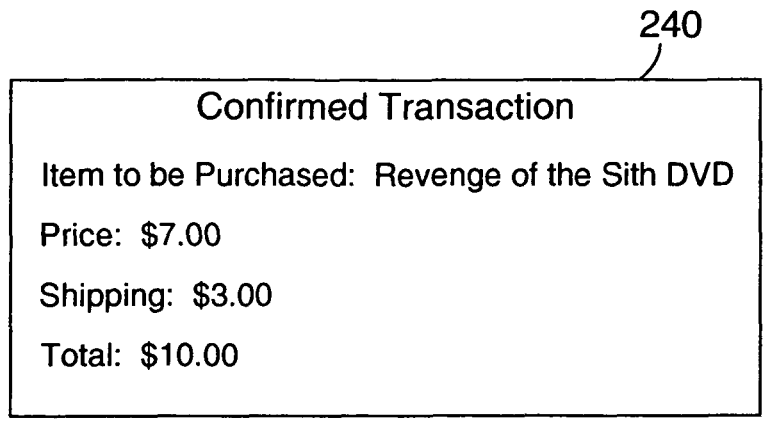
FIG. 8 is a sample confirmed transaction based on the data in the transaction draft in FIG. 7.

In analyzing the chat text, there are five distinct dollar amounts mentioned, namely $3, $5, $7, $15 and $20. Note that these five possible prices are shown to the right of the Price field 620. Either the buyer or the seller may select the appropriate price by simply clicking on the correct price to the right of the Price field 620, which inserts the selected price into the Price field 620. In the alternative, the buyer or the seller may manually enter a price into the Price field 620. In similar fashion, the Other Charges field 630 may be filled in my clicking on one of the dollar amounts to the right, or by manually entering the amount into the Other Charges field 630. The Description of Other Charges field 640 allows text to be entered to describe the other charges. Note that the analyzed chat text shows Shipping to the right of the field 640 as one possible value for the description of the other charges, based on the analyzed chat text. The buyer or seller may enter Shipping into the Description of Other Charges field 640 by simply clicking on the Shipping to the right of the field 640, or by manually typing Shipping into field 640. The amount displayed in the Total field 650 is the sum of the amount in the Price field 620 and the amount in the Other Charges field 630. We assume for the example shown in FIG. 6 that the values from the analyzed chat text are listed near the fields, and the buyer or seller must select the correct values. Note, however, that the best mode of the invention provides "best guesses" at the values, as shown in FIG. 7. The values for the fields in FIG. 7 reflect the actual agreement between buyer and seller. Note that the best guesses may not get all information correct, which will require buyer or seller to correct any incorrect best guess. Once all the information in the transaction draft is correct, as shown in FIG. 7, both buyer and seller click on the confirm transaction button 660 in their respective displays. This causes a confirmed transaction to be sent by both buyer and seller to the agent, which allows the agent to validate the confirmed transaction by comparing the two. The confirmed transaction 240 corresponding to the transaction draft 210 in FIG. 7 is shown in FIG. 8. Once validated, the agent initiates the transfer of funds from buyer to seller, and logs the completed transaction.

While the values from the analyzed chat text are shown in FIGS. 6 and 7 near their corresponding fields, one skilled in the art will realize these values may be presented to the user in any suitable way. For example, drop-down lists, radio button lists, separate windows, etc. may be used to display the analyzed chat text to the user. Note also that the user may click on the Show Chat Window button 680 to display the original chat session upon which the transaction is based to verify the agreed-upon terms. In the original chat window, the words that were parsed and presented in the transaction draft could be highlighted to draw attention to the relevant context.

Figure 9:
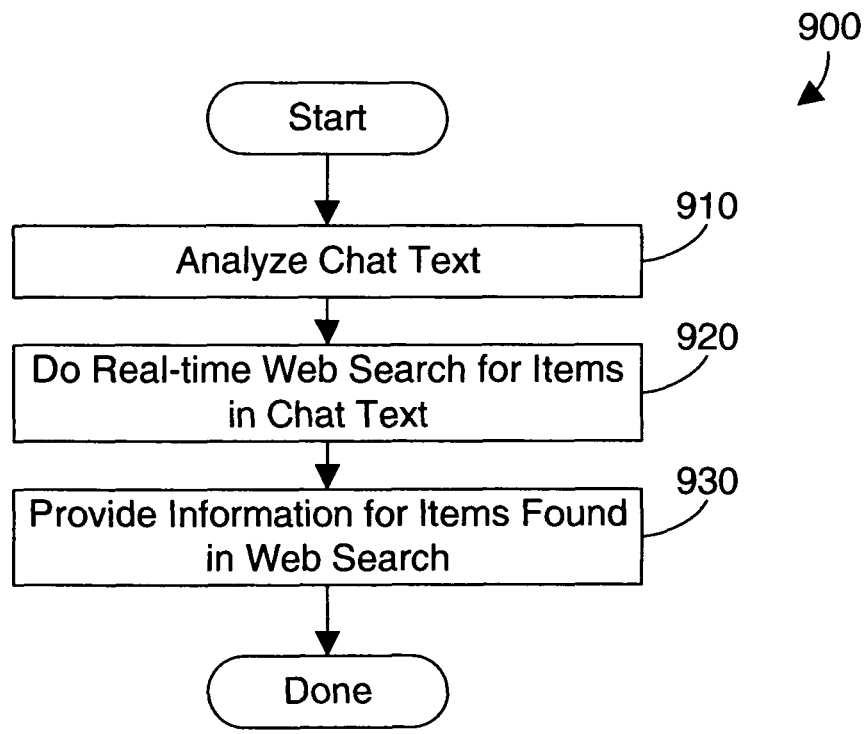
FIG. 9 is a flow diagram of a method in accordance with the preferred embodiments for performing a real-time web search based on chat text.

One possible feature within the scope of the preferred embodiments allows performing automatic web searches based on the chat text in a current chat session. Referring to FIG. 9, a method 900 in accordance with the preferred embodiments analyzes chat text (step 910), and performs one or more real-time web searches for items in the analyzed chat text (step 920). Once one or more of the searches have been done, information from the search may be provided (step 930). The capability to automatically perform web searches based on chat text is a powerful enhancement to the IM financial transaction mechanism of the preferred embodiments. Several examples are provide above in the discussion of the real-time web search mechanism 128 in FIG. 1 that illustrate the advantages of having searches automatically done based on chat text. The real-time web search mechanism 128 in FIG. 1 and its corresponding method 900 in FIG. 9 expressly extend to automatically providing any information that results from an automated web search based on chat text.

We now present an example that shows the power of performing a real-time web search based on the chat text. Let's assume the chat text is analyzed periodically and a real-time web search is performed for any nouns that appear to represent a commercial product. Thus, when Jim says he got two copies of Revenge of the Sith for Christmas, a web search could be automatically performed to locate Revenge of the Sith. At this point in the chat session, the media type has not been specified, so the real-time web search could return results for both VHS and DVD. When the query results are displayed to Jim, he could select DVD, thus narrowing the search results to those pertaining to DVDs. In the alternative, the chat text could continue to be analyzed, and once the DVD appears in the chat text, the search results could be automatically narrowed to only DVDs. In yet another alternative, the transaction draft could specify both media types found in the search for Revenge of the Sith, allowing either buyer or seller to specify the media type. The preferred embodiments extends to any suitable use of information from an automatic real-time web search based on chat text.

The preferred embodiments provide a simple and secure way to perform financial transactions in an instant messaging environment. Text from a chat session is analyzed, and a draft transaction is presented to buyer and seller, who can both modify the draft transaction, and who must both confirm the draft transaction for the transaction to be completed. Once confirmed, a transfer of funds is initiated from buyer to seller, and the transaction is logged. By providing a simple yet secure way to perform financial transactions in an instant messaging environment, the preferred embodiments allow for the expansion of e-commerce to inexpensive items and further allow financial transactions to occur between non-commercial buyers and sellers.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the invention has been described above in the context of an unmonitored and unregulated peer to peer IM environment, some users may prefer to have a trusted third party act as a middleman and manager the authentication and verification of financial transactions. This could be a valuable enhancement in which a company provides the service as described above and manages the authentication, transactions, and any possible disputes. In return, the company would take a certain percent of the transaction amount in return for the services. Having a third party perform any of the functions discussed above is within the scope of the preferred embodiments.

What is claimed is:

1. A computer-implemented method for performing a financial transaction in an instant messaging environment, the method comprising the steps of:
providing at least one processor;
providing a memory coupled to the at least one processor, the memory comprising an instant messaging client that provides the instant messaging environment, the at least one processor performing the steps of;
a first user and a second user having a chat session in the instant messaging environment;
activating a financial transaction mechanism;
analyzing text from the chat session;
presenting a draft transaction based on the analyzed text to the first and second users;
in response to analyzing the text from the chat session, automatically performing a real-time web search without the first user initiating the real-time web search based on the analyzed text from the chat session to determine available pricing from a plurality of vendors unrelated to the first and second users for at least one item in the draft transaction;
providing to the first user the available pricing from the plurality of vendors for the at least one item in the draft transaction found in performing the automatic real-time web search;
receiving at least one change to the draft transaction from the first and second users; and
receiving a confirmation of the draft transaction from the first and second users resulting in a confirmed transaction that results in purchase of the at least one item by the first user from the second user.

2. A non-transitory computer-readable media storing computer-readable code that, when executed, causes a processor to perform the steps comprising:
a first user of an instant messaging client activating a financial transaction mechanism residing on the recordable media based on a chat session with a second user, and in response, the financial transaction mechanism performing the steps of:
analyzing text from the chat session;
presenting a draft transaction based on the analyzed text;
in response to analyzing the text from the chat session, automatically performing a real-time web search without the first user initiating the real-time web search based on the analyzed text from the chat session to determine available pricing from a plurality of vendors unrelated to the first and second users for at least one item in the draft transaction;
providing to the first user the available pricing from the plurality of vendors for the at least one item in the draft transaction found in performing the automatic real-time web search;
receiving at least one change to the draft transaction from the first user; and
receiving a confirmation of the draft transaction from the first user, resulting in a confirmed transaction that results in purchase of the at least one item by the first user from the second user.

\* \* \* \* \*